(12) United States Patent
Lorenz et al.

(10) Patent No.: US 8,772,377 B2
(45) Date of Patent: *Jul. 8, 2014

(54) DISPERSANT COMPRISING COPOLYMER MIXTURE

(75) Inventors: Klaus Lorenz, Zangberg (DE); Mario Vierle, Wasserburg (DE); Gerhard Albrecht, Prien am Chiemsee (DE); Barbara Wimmer, Tacherting (DE); Petra Wagner, Trostberg (DE); Christian Scholz, Wald an der Alz (DE)

(73) Assignee: Construction Research & Technology GmbH, Trostberg (DE)

( * ) Notice: Subject to any disclaimer, the term of this patent is extended or adjusted under 35 U.S.C. 154(b) by 422 days.

This patent is subject to a terminal disclaimer.

(21) Appl. No.: 13/133,043

(22) PCT Filed: Nov. 25, 2009

(86) PCT No.: PCT/EP2009/065791
§ 371 (c)(1),
(2), (4) Date: Oct. 14, 2011

(87) PCT Pub. No.: WO2010/076096
PCT Pub. Date: Jul. 8, 2010

(65) Prior Publication Data
US 2012/0041104 A1  Feb. 16, 2012

(30) Foreign Application Priority Data
Dec. 8, 2008 (EP) .................... 0817098

(51) Int. Cl.
| C04B 28/02 | (2006.01) |
| C08J 3/02 | (2006.01) |
| C08L 39/04 | (2006.01) |
| C08L 33/14 | (2006.01) |
| C04B 24/26 | (2006.01) |
| C08L 33/26 | (2006.01) |
| C08L 43/02 | (2006.01) |
| C04B 40/00 | (2006.01) |
| C04B 28/00 | (2006.01) |
| C08J 3/00 | (2006.01) |
| C08L 39/00 | (2006.01) |
| C08L 33/00 | (2006.01) |
| C04B 103/40 | (2006.01) |
| C04B 103/32 | (2006.01) |

(52) U.S. Cl.
CPC ....... *C04B 24/2647* (2013.01); *C04B 2103/408* (2013.01); *C04B 24/2658* (2013.01); *C08L 33/26* (2013.01); *C08L 33/14* (2013.01); *C08L 43/02* (2013.01); *C04B 40/0039* (2013.01); *C04B 24/267* (2013.01); *C04B 2103/32* (2013.01)
USPC ............... 524/4; 524/501; 524/515; 525/203; 525/212; 525/231

(58) Field of Classification Search
USPC ............... 524/4, 501, 515; 525/203, 212, 231
See application file for complete search history.

(56) References Cited

U.S. PATENT DOCUMENTS

| 5,362,323 A | 11/1994 | Koyata et al. |
| 6,140,440 A | 10/2000 | Kinoshita et al. |
| 6,777,517 B1 | 8/2004 | Albrecht et al. |
| 8,461,232 B2 * | 6/2013 | Vierle et al. ............ 524/4 |
| 2007/0161724 A1 | 7/2007 | Moraru et al. |

FOREIGN PATENT DOCUMENTS

| EP | 0 556 061 A1 | 8/1993 |
| EP | 0 924 174 A1 | 6/1999 |
| WO | WO 00/77058 A1 | 12/2000 |
| WO | WO 2005/075529 A2 | 8/2005 |

OTHER PUBLICATIONS

U.S. Appl. No. 13/133,022 Claims.*
PCT/EP2009/065791—International Preliminary Report on Patentability, Jun. 14, 2011.
PCT/EP2009/065791—International Search Report, Mar. 17, 2010.
PCT/EP2009/065791—International Written Opinion, Mar. 17, 2010.

* cited by examiner

Primary Examiner — Duc Truong
(74) Attorney, Agent, or Firm — Curatolo Sidoti Co., LPA; Joseph G. Curatolo; Salvatore A. Sidoti

(57) ABSTRACT

The invention relates to a polymer composition containing 3 to 95% by weight of a copolymer H and 3 to 95% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, the polyether macromonomer structural units of the copolymers H and K having side chains containing in each case at least 5 ether oxygen atoms, the number of ether oxygen atoms per side chain of the polyether macromonomer structural units of the copolymers H and K varying in each case in such a way that the corresponding frequency distribution diagrams, in which the number of ether oxygen atoms per side chain of a polyether macromonomer structural unit is plotted in each case along the abscissae and the respectively associated frequencies for the copolymers H or K are plotted in each case along the ordinates, contain in each case at least 2 maxima whose abscissa values differ in each case by more than 7 ether oxygen atoms from one another, the frequency distribution diagrams of the copolymers H and K differing from one another in that the abscissa value of at least one maximum of the copolymer H differs in each case by more than 5 ether oxygen atoms from the abscissa values of all maxima of the copolymer K and/or that the arithmetic means of the ether oxygen atoms of the polyether macromonomer structural units of the copolymers H and K differ from one another by more than 5 ether oxygen atoms.

20 Claims, 1 Drawing Sheet

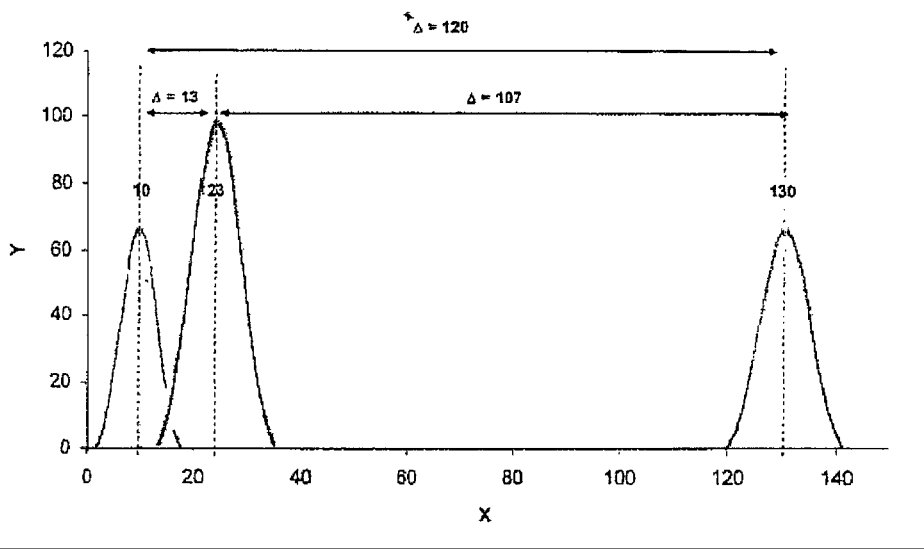
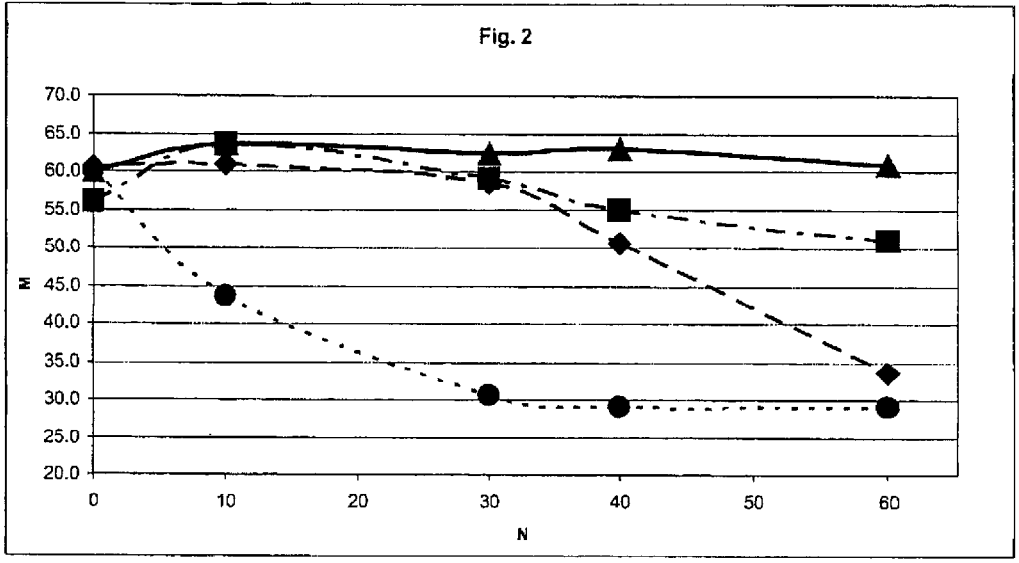

DISPERSANT COMPRISING COPOLYMER MIXTURE

CROSS REFERENCE TO RELATED APPLICATIONS

This application is a national stage application of International Application No. PCT/EP2009/065791, filed 25 Nov. 2009, which claims priority from European Patent Application Serial No. 08170983.4, filed 8 Dec. 2008, from which applications priority is claimed, and which are incorporated herein by reference.

The present invention relates to a polymer composition, a dispersant, the preparation of the polymer composition and of the dispersant and the use of the polymer composition.

It is known that admixtures in the form of dispersants are often added to aqueous slurries of powdery inorganic or organic substances, such as clays, silicate powder, chalk, carbon black, crushed rock and hydraulic binders, for improving their workability, i.e. kneadability, spreadability, sprayability, pumpability or flowability. Such admixtures are capable of preventing the formation of solid agglomerates, of dispersing particles which are already present and particles newly formed by hydration and in this way of improving the workability. This effect is utilized in particular in a targeted manner in the preparation of building material mixtures which contain hydraulic binders, such as cement, lime, gypsum, hemihydrate or anhydrite.

In order to convert these building material mixtures based on said binders into a ready-to-use workable form, as a rule substantially more mixing water is required than would be necessary for the subsequent hydration or hardening process. The portion of cavities formed in the concrete body due to the excess, subsequently evaporating water leads to significantly poorer mechanical strengths and durabilities.

In order to reduce this excess proportion of water at a specified processing consistency and/or to improve the workability at a specified water/binder ratio, admixtures which are generally referred to as water reduction agents or superplasticizers are used. In particular, copolymers which are prepared by free radical copolymerization of acid monomers and/or acid derivative monomers with polyether macromonomers are used in practice as such agents.

WO 2005/075529 describes copolymers which, in addition to acid monomer structural units, have vinyloxybutylenepoly (ethylene glycol) structural units as polyether macromonomer structural units. Such copolymers are widely used as high-performance superplasticizers since they have excellent performance characteristics.

Although the copolymers described are to be regarded as economical high-performance superplasticizers, there continues to be an aspiration to improve further the quality and the cost-efficiency of the copolymers.

The object of the present invention is therefore to provide an economical dispersant for hydraulic binders, which is suitable in particular as a superplasticizer for concrete.

The achievement of this object is a polymer composition containing 3 to 95% by weight of a copolymer H and 3 to 95% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, the polyether macromonomer structural units of the copolymers H and K having side chains containing in each case at least 5 ether oxygen atoms, the number of ether oxygen atoms per side chain of the polyether macromonomer structural units of the copolymers H and K varying in each case in such a way that the corresponding frequency distribution diagrams, in which the number of ether oxygen atoms per side chain of a polyether macromonomer structural unit is plotted in each case along the abscissae and the respectively associated frequencies for the copolymers H or K are plotted in each case along the ordinates, contain in each case at least 2 maxima whose abscissa values differ in each case by more than 7 ether oxygen atoms from one another, the frequency distribution diagrams of the copolymers H and K differing from one another in that the abscissa value of at least one maximum of the copolymer H differs in each case by more than 5 ether oxygen atoms from the abscissa values of all maxima of the copolymer K and/or that the arithmetic means of the ether oxygen atoms of the polyether macromonomer structural units of the copolymers H and K differ from one another by more than 5 ether oxygen atoms.

The acid monomer structural units are produced by incorporating the corresponding acid monomers in the form of polymerized units. In this context, acid monomer is to be understood as meaning monomers which are capable of free radical copolymerization, have at least one carbon double bond, contain at least one acid function and react as an acid in an aqueous medium. Furthermore, acid monomer is also to be understood as meaning monomers which are capable of free radical copolymerization, have at least one carbon double bond, form at least one acid function as a result of a hydrolysis reaction in an aqueous medium and react as an acid in an aqueous medium (example: maleic anhydride or base-hydrolyzable acrylic esters, such as ethyl acrylate). The polyether macromonomer structural units are produced by incorporating the corresponding polyether macromonomers in the form of polymerized units. In this connection, polyether macromonomers are, in the context of the present invention, compounds which are capable of free radical copolymerization and have at least one carbon double bond and which have ether oxygen atoms. The polyether macromonomer structural units present in the copolymer therefore have in each case at least one side chain which contains ether oxygen atoms.

In general, it may be said that the mode of action of relevant copolymers having polyether macromonomer structural units and acid structural units is determined by their structural parameters. The action spectrum of corresponding high-performance copolymers covers the entire range from extreme water reduction to extreme slump retention, where structural parameters which ensure water reduction are conflicting with structural parameters that provide good slump retention. Thus, in addition to the charge quantity per unit mass, the length of the side chains is also decisive, for example with regard to the water reduction capability. The metering of the relevant superplasticizer copolymers is usually carried out as a percentage of the cement weight of a cementitious mixture—i.e. mass-based. As a rule, not only the applied mass but also the number of active substance molecules is decisive for the mode of action. However, long side chains have a high mass, which runs contrary to as large as possible a number of copolymer molecules per unit mass. By targeted incorporation of short side chains in addition to long side chains, the molar mass of the copolymers can be reduced but without adversely affecting the dispersing effect also due to the long side chains. Thus, it is often appropriate to incorporate short and long polyether side chains at the same time in the copolymer molecule and to do so according to the principle of "in each case as many of the longer ones as necessary but as few as possible". Copolymer superplasticizers can be optimized in this way with regard to their mass efficiency. This optimization can be carried out separately for both extremes of the action spectrum (water reduction, slump retention). In applications where both water reduction and maintenance of consistency are required, a physical mixture of these respective mass-optimized superplasticizer copolymers can advantageously be used compared with an individual superplasticizer copolymer optimized for an application. Advantages are a greater robustness with respect to the cement quality (alkali and sulphate content), temperature variations or the possibility of easy adaptation of the mixture. In summary, it may be said that the polymer composition according to the invention represents a particularly economical and high-quality dispersant or superplasticizer.

In general, the polymer composition according to the invention contains 10 to 85% by weight of the copolymer H and 10 to 85% by weight of the copolymer K.

Preferably, at least 50 mol % of all structural units of the copolymer H and at least 50 mol % of all structural units of the copolymer K are present in each case in the form of acid monomer structural units.

In general, the number of ether oxygen atoms per side chain of the polyether macromonomer structural units of the copolymers H and K vary in each case in such a way that the corresponding frequency distribution diagrams, in which the number of ether oxygen atoms per side chain of a polyether macromonomer structural unit is plotted in each case along the abscissae and the respectively associated frequencies for the copolymers H or K are plotted in each case along the ordinates, contain in each case at least 2 maxima whose abscissa values differ in each case by more than 10 ether oxygen atoms from one another.

Often the number of ether oxygen atoms per side chain of the polyether macromonomer structural units of the copolymers H and K vary in each case in such a way that the corresponding frequency distribution diagrams, in which the number of ether oxygen atoms per side chain of a polyether macromonomer structural unit is plotted in each case along the abscissae and the respectively associated frequencies for the copolymers H or K are plotted in each case along the ordinates, contain in each case at least 2 maxima whose abscissa values differ in each case from one another by more than 10 ether oxygen atoms, the frequency distribution diagrams of the copolymers H and K differing from one another in that the abscissa value of at least one maximum of the copolymer H differs in each case by more than 10 ether oxygen atoms from the abscissa values of all maxima of the copolymer K.

As a rule, the acid monomer structural units of the copolymers H and K are present in each case according to one of the general formulae (Ia), (Ib), (Ic) and/or (Id)

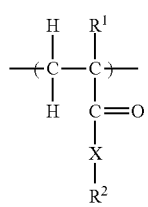

(Ia)

where
$R^1$ are identical or different and are represented by H and/or a straight-chain or a branched $C_1$-$C_4$ alkyl group;
X are identical or different and are represented by NH—$(C_nH_{2n})$ where n=1, 2, 3 or 4 and/or O—$(C_nH_{2n})$ where n=1, 2, 3 or 4 and/or by a unit not present;
$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

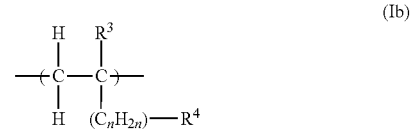

(Ib)

where
$R^3$ are identical or different and are represented by H and/or a straight-chain or branched $C_1$-$C_4$ alkyl group;
n=0, 1, 2, 3 or 4;
$R^4$ are identical or different and are represented by $SO_3H$, $PO_3H_2$, O—$PO_3H_2$ and/or para-substituted $C_6H_4$—$SO_3H$;

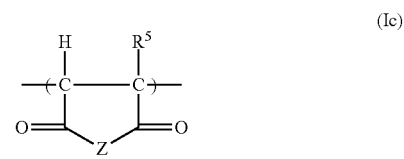

(Ic)

where
$R^5$ are identical or different and are represented by H and/or a straight-chain or branched $C_1$-$C_4$ alkyl group;
Z are identical or different and are represented by O and/or NH;

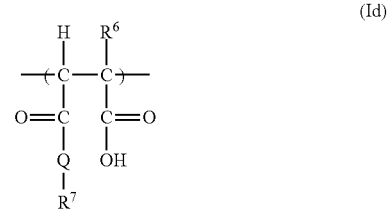

(Id)

where
$R^6$ are identical or different and are represented by H and/or a straight-chain or branched $C_1$-$C_4$ alkyl group;
Q are identical or different and are represented by NH and/or O;
$R^7$ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-(A'O)$_\alpha$—$R^9$ where m=0, 1, 2, 3 or 4, e=0, 1, 2, 3 or 4, A'=$C_xH_{2x'}$ where x'=2, 3, 4 or 5 and/or $CH_2C(C_6H_5)H$—, $\alpha$=an integer from 1 to 350 with $R^9$ identical or different and represented by a straight-chain or a branched $C_1$-$C_4$ alkyl group.

Depending on the pH, the acid monomer structural units can also be present in deprotonated form as a salt, in which case typical counterions are $Na^+$, $K^+$ and $Ca^{2+}$.

Frequently, the acid monomer structural units of the copolymers H and K are produced in each case by incorporation of the acid monomers methacrylic acid, acrylic acid, maleic acid, maleic anhydride and/or monoesters of maleic acid in the form of polymerized units.

Preferably, the polyether macromonomer structural units of the copolymers H and K are present in each case according to one of the general formulae (IIa), (IIb) and/or IIc)

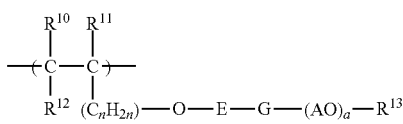
(IIa)

where
$R^{10}$, $R^{11}$ and $R^{12}$ in each case are identical or different and, independently of one another, are represented by H and/or a straight-chain or a branched $C_1$-$C_4$ alkyl group;
E are identical or different and are represented by a straight-chain or branched $C_1$-$C_6$ alkylene group, a cyclohexyl group, $CH_2$—$C_6H_{10}$, ortho-, meta- or para-substituted $C_6H_4$ and/or a unit not present;
G are identical or different and are represented by O, NH and/or CO—NH, with the proviso that, if E is a unit not present, G is also present as a unit not present;
A are identical or different and are represented by $C_xH_{2x}$ where x=2, 3, 4 and/or 5 (preferably x=2) and/or $CH_2CH(C_6H_5)$;
n are identical or different and are represented by 0, 1, 2, 3, 4 and/or 5;
a are identical or different and are represented by an integer from 5 to 350 (preferably 10-200);
$R^{13}$ are identical or different and are represented by H, a straight-chain or a branched $C_1$-$C_4$ alkyl group, CO—$NH_2$ and/or $COCH_3$;

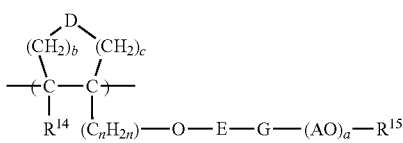
(IIb)

where
$R^{14}$ are identical or different and are represented by H and/or a straight-chain or a branched $C_1$-$C_4$ alkyl group;
E are identical or different and are represented by a straight-chain or a branched $C_1$-$C_6$ alkylene group, a cyclohexyl group, $CH_2$—$C_6H_{10}$, ortho-, meta- or para-substituted $C_6H_4$ and/or by a unit not present;
G are identical or different and are represented by a unit not present, O, NH and/or CO—NH, with the proviso that, if E is a unit not present, G is also present as a unit not present;
A are identical or different and are represented by $C_xH_{2x}$ where x=2, 3, 4 and/or 5 and/or $CH_2CH(C_6H_5)$;
n are identical or different and are represented by 0, 1, 2, 3, 4 and/or 5;
a are identical or different and are represented by an integer from 5 to 350;
D are identical or different and are represented by a unit not present, NH and/or O, with the proviso that, if D is a unit not present: b=0, 1, 2, 3 or 4 and c=0, 1, 2 or 4, where b+c=3 or 4, and with the proviso that, if D is NH and/or O: b=0, 1, 2 or 3, c=0, 1, 2 or 3, where b+c=2 or 3;
$R^{15}$ are identical or different and are represented by H, a straight-chain or a branched $C_1$-$C_4$ alkyl group, CO—$NH_2$, and/or $COCH_3$;

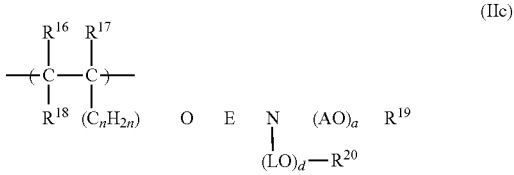
(IIc)

where
$R^{16}$, $R^{17}$ and $R^{18}$ in each case are identical or different and, independently of one another, are represented by H and/or a straight-chain or a branched $C_1$-$C_4$ alkyl group;
E are identical or different and are represented by a straight-chain or a branched $C_1$-$C_6$ alkylene group, a cyclohexyl group, $CH_2$—$C_6H_{10}$ and/or ortho-, meta- or para-substituted $C_6H_4$:
A are identical or different and are represented by $C_xH_{2x}$ where x=2, 3, 4 and/or 5 and/or $CH_2CH(C_6H_5)$;
n are identical or different and are represented by 0, 1, 2, 3, 4 and/or 5;
L are identical or different and are represented by $C_xH_{2x}$ where x=2, 3, 4 and/or 5 and/or $CH_2$—$CH(C_6H_5)$;
a are identical or different and are represented by an integer from 5 to 350;
d are identical or different and are represented by an integer from 1 to 350;
$R^{19}$ are identical or different and are represented by H and/or a straight-chain or branched $C_1$-$C_4$ alkyl group;
$R^{20}$ are identical or different and are represented by H and/or a straight-chain $C_1$-$C_4$ alkyl group.

Frequently, the polyether macromonomer structural units of the copolymers H and K are produced in each case by incorporation of the polyether macromonomers alkoxylated hydroxybutyl vinyl ether and/or alkoxylated diethylene glycol monovinyl ether and/or alkoxylated isoprenol and/or alkoxylated (meth)allyl alcohol and/or vinylated methylpolyalkylene glycol having preferably in each case an arithmetic mean of 6 to 300 oxyalkylene groups in the form of polymerized units.

The alkoxy units of the polyether macromonomers are present normally as ethoxy groups or as a mixture of ethoxy and propoxy groups (these polyether macromonomers are obtainable from the ethoxylation or ethoxylation and propoxylation of the corresponding monomer alcohols).

The copolymers H and K may have in each case the same or different types of polyether macromonomer structural units and/or acid monomer structural units.

As a rule, in each case at least 45 mol %, preferably at least 80 mol %, of all structural units of the copolymers H and K are produced by incorporation of acid monomer and polyether macromonomer in the form of polymerized units.

The invention also relates to a dispersant which contains at least 30% by weight of water and at least 10% by weight of the polymer composition described above. The dispersant is preferably present in the form of an aqueous solution.

Furthermore, the present invention also relates to a process for the preparation of the polymer composition according to the invention or of the dispersant according to the invention, in which the copolymers H and K are each prepared separately from one another in aqueous solution and the separately prepared copolymers or the separately prepared aqueous solutions are then mixed with one another.

Normally, acid monomer and polyether macromonomer are reacted by free radical polymerization with the use of a peroxide-containing redox initiator system in aqueous solution, the temperature of the aqueous solution during the polymerization being 10 to 45° C. and the pH being 3.5 to 6.5.

Finally, the invention also relates to the use of the polymer composition according to the invention as a dispersant for hydraulic binders and/or for latent hydraulic binders. Typically, the hydraulic binder is present as cement, lime, gypsum, hemihydrate or anhydrite or mixtures of these components, preferably as cement. The latent hydraulic binder is usually present as fly ash, trass or blast furnace slag. The polymer composition according to the invention can also be used, for example (particularly in dewatered form), as an additive for cement production (grinding aid and "water reducer" for fine Portland cements or composite cements).

Below, the invention is to be explained in more detail with reference to working examples in combination with the drawing.

The drawing shows:

In FIG. 1, a diagram which shows in a schematic manner the frequency of the number of ether oxygen atoms of the side chains and which relates to the polymer composition according to the invention in accordance with the example of use and in FIG. 2, a diagram which shows the slump as a function of time and in which a polymer composition according to the invention in accordance with the use example is compared with other polymer compositions.

SYNTHESIS EXAMPLE 1

Copolymer H of the Polymer Composition According to the Invention 227 g of deionized water and 250 g of vinyloxybutylpolyethylene glycol-1100 (adduct of 22 mol of ethylene oxide with hydroxybutyl monovinyl ether) and 113.6 g of vinyloxybutylpolyethylene glycol-500 (adduct of 9 mol of ethylene oxide with hydroxybutyl monovinyl ether) were initially taken in a glass reactor equipped with stirrer, pH electrode and a plurality of feed devices and were cooled to a polymerization starting temperature of 12° C. (initially taken mixture).

In a separate feed vessel, 39.3 g of acrylic acid and 29.58 g of hydroxypropyl acrylate were mixed homogeneously with 206.65 g of deionized water. With 23.27 g of a 40% strength potassium hydroxide solution and with cooling, the solution was adjusted to a temperature of 20° C. and a pH of 4.0. 2.88 g of 3-mercaptopropionic acid were then added as the molecular weight regulator (solution A).

Simultaneously, a second solution consisting of 2.07 g of a mixture of the disodium salt of 2-hydroxy-2-sulphinatoacetic acid, the disodium salt of 2-hydroxy-2-sulphonatoacetic acid and sodium sulphite (Brüggolit® FF6 from Brüggemann GmbH) and 66.93 g of water was prepared (solution B).

89.6 g of solution A and then 5.9 g of a 20% strength aqueous sodium hydroxide solution and 1.55 g of 3-mercaptopropionic acid as a molecular weight regulator were then added to the initially taken mixture with stirring and cooling.

0.085 g of iron(II) sulphate heptahydrate and 5.22 g of hydrogen peroxide (30% in water) were then added in succession to the initially taken mixture. At the same time, the addition of solution A and solution B to the stirred initially taken mixture was begun.

The rate of addition of the remaining solution A is shown in the following metering profile. The rate of addition of solution B is 33.5 g/h for 45 min, is then increased to 205 g/h and metering is continued until the entire solution is in the reactor. During the reaction time, 18 g of a 20% strength aqueous sodium hydroxide solution are added stepwise.

| | t (min) | | | | | | | | | | | | | | | |
|---|---|---|---|---|---|---|---|---|---|---|---|---|---|---|---|---|
| | 0 | 1.5 | 3 | 6 | 9 | 12 | 15 | 18 | 21 | 24 | 27 | 30 | 33 | 36 | 39 | 45 |
| Solution A (g/h) | 143 | 287 | 502 | 600 | 558 | 502 | 430 | 343 | 272 | 212 | 170 | 127 | 103 | 72 | 63 | 0 |

After complete addition of the solutions A and B, peroxide was no longer found in the reaction vessel.

The polymer solution obtained was then adjusted to a pH of 6.5 with about 42 g of a 20% strength sodium hydroxide solution.

The copolymer obtained was present in a slightly yellowish solution which had a solids content of 44.3%. The average molecular weight of the copolymer was Mw 24 000 g/mol; conversion according to GPC: 95%.

SYNTHESIS EXAMPLE 2

Copolymer K of the Polymer Composition According to the Invention 423.4 g of deionized water and 16.65 g of vinyloxybutylpolyethylene glycol-1100 (adduct of 22 mol of ethylene oxide with hydroxybutyl monovinyl ether) and 351.25 g of vinyloxybutylpolyethylene glycol-5800 (adduct of 129 mol of ethylene oxide with hydroxybutyl monovinyl ether) were initially taken in a glass reactor equipped with stirrer, pH electrode and a plurality of feed devices and were cooled to a polymerization starting temperature of 15° C. (initially taken mixture).

In a separate feed vessel, 19.64 g of acrylic acid and 15.76 g of hydroxypropyl acrylate were mixed homogeneously with 106.20 g of deionized water. With 5.44 g of a 40% strength potassium hydroxide solution, and with cooling the solution was adjusted to a temperature of 20° C. and a pH of 3.5. 2.52 g of 3-mercaptopropionic acid were then added as the molecular weight regulator (solution A).

Simultaneously, a second solution consisting of 1.68 g of a mixture of the disodium salt of 2-hydroxy-2-sulphinatoacetic acid, the disodium salt of 2-hydroxy-2-sulphonatoacetic acid and sodium sulphite (Brüggolit® FF6 from Brüggemann GmbH) and 26.32 g of water was prepared (solution B).

73.5 g of solution A and then 11.0 g of a 20% strength aqueous sodium hydroxide solution and 0.28 g of 3-mercaptopropionic acid as a molecular weight regulator were then added to the initially taken mixture with stirring and cooling.

0.1488 g of iron(II) sulphate heptahydrate and 2.53 g of hydrogen peroxide (30% in water) were then added in succession to the initially taken mixture. At the same time, the addition of solution A and solution B to the stirred initially taken mixture was begun.

The rate of addition of the remaining solution A is shown in the following metering profile. The rate of addition of solution B is 36.9 g/h for 30 min, is then increased to 89 g/h and metering is continued until the entire solution is in the reactor. During the reaction time, 1.6 g of a 20% strength aqueous sodium hydroxide solution are added stepwise.

|  | t (min) | | | | | | | | | | | |
| --- | --- | --- | --- | --- | --- | --- | --- | --- | --- | --- | --- | --- |
|  | 0 | 2 | 4 | 6 | 8 | 10 | 12 | 14 | 16 | 18 | 22 | 26 | 30 |
| Solution A (g/h) | 222 | 247 | 257 | 257 | 247 | 222 | 182 | 149 | 119 | 92 | 56.9 | 35 | 0 |

After complete addition of the solutions A and B, peroxide was no longer found in the reaction vessel.

The polymer solution obtained was then adjusted to a pH of 6.5 with about 30 g of a 20% strength sodium hydroxide solution.

The copolymer obtained was present in a slightly yellowish solution which had a solids content of 40.6%. The average molecular weight of the copolymer was Mw 73 000 g/mol; conversion according to GPC: 87%.

SYNTHESIS EXAMPLE 3

For Comparison—does not Relate to Polymer Composition According to the Invention "Chemical Mixture"

Corresponding to 0.7 part of copolymer K and 0.3 part of copolymer H 59.64 g of deionized water and 15.95 g of vinyloxybutylpolyethylene glycol-1100 (adduct of 22 mol of ethylene oxide with hydroxybutylmonovinyl ether and 162.40 g of vinyloxybutylpolyethylene glycol-5800 (adduct of 129 mol of ethylene oxide with hydroxybutyl monovinyl ether) and 3.75 g of vinyloxybutylpolyethylene glycol-500 (adduct of 10 mol of ethylene oxide with hydroxybutyl monovinyl ether) were initially taken in a glass reactor equipped with stirrer, pH electrode and a plurality of feed devices and were cooled to a polymerization starting temperature of 15° C. (initially taken mixture).

In a separate feed vessel, 10.38 g of acrylic acid and 8.26 g of hydroxypropyl acrylate were homogeneously mixed with 67.2 g of deionized water. With 3.05 g of a 40% strength potassium hydroxide solution, and with cooling the solution was adjusted to a temperature of 20° C. and a pH of 3.5 (solution A).

Simultaneously, a second solution consisting of 3 g of a mixture of the disodium salt of 2-hydroxy-2-sulphinatoacetic acid, the disodium salt of 2-hydroxy-2-sulphonatoacetic acid and sodium sulphite (Brüggolit® FF6 from Brüggemann GmbH) and 47 g of water was prepared (solution B).

44.75 g of solution A and then 2.6 g of a 20% strength aqueous sodium hydroxide solution and 0.16 g of 3-mercaptopropionic acid as a molecular weight regulator were added to the initially taken mixture with stirring and cooling. 1.44 g of 3-mercaptopropionic acid were added to the remainder of solution A.

After the pH of 5.3 had been reached in the initially taken mixture, 0.0875 g of iron(II) sulphate heptahydrate and 1.49 g of hydrogen peroxide (30% in water) were added in succession to the initially taken mixture. At the same time, the addition of solution A and solution B to the stirred initially taken mixture was begun.

The rate of addition of the remaining solution A is shown in the following metering profile. The rate of addition of solution B is 20.8 g/h for 30 min, is then increased to 100 g/h and metering is continued until the entire solution is in the reactor. During the reaction time, 3.9 g of a 20% strength aqueous sodium hydroxide solution are added stepwise.

|  | t (min) | | | | | | | | | | | |
| --- | --- | --- | --- | --- | --- | --- | --- | --- | --- | --- | --- | --- |
|  | 0 | 2 | 4 | 6 | 8 | 10 | 12 | 14 | 16 | 18 | 22 | 26 | 30 |
| Solution A (g/h) | 140 | 155 | 162 | 162 | 155 | 140 | 114 | 94 | 75 | 58 | 36 | 22 | 0 |

After complete addition of the solutions A and B, peroxide was no longer found in the reaction vessel.

The polymer solution obtained was then adjusted to a pH of 6.5 with about 15 g of a 20% strength sodium hydroxide solution.

The copolymer obtained was present in a slightly yellowish solution which had a solids content of 41.5%. The average molecular weight of the copolymer was Mw 57 000 g/mol; conversion according to GPC: 89%.

For the preparation of the polymer composition according to the invention (for the below-described use example according to the invention of the 'physical mixture'), 129.21 g of the polymer solution of copolymer K (synthesis example 2) were mixed with 50 g of the polymer solution of copolymer H (synthesis example 1), which, based on the respective polymer solid of the copolymers H and K, corresponds to a mixing ratio of 70:30. The schematic diagram according to FIG. 1 shows, along the abscissa (X), the number of ether oxygen atoms per side chain of the polyether macromonomer structural units (of all copolymers H and K) of the polymer composition according to the invention which was prepared in this manner and, along the ordinate (Y), the respective associated frequencies. The greatest frequency results with an average number of ether oxygen atoms of 23 since the frequencies of the copolymers H and K here which correspond to the raw material vinyloxybutylpolyethylene glycol-1100 (adduct of 22 mol of ethylene oxide with hydroxybutyl monovinyl ether) used in both synthesis examples 1 and 2 are additive. The average number of 23 is obtained by taking into account a further ether oxygen atom from the vinylic "head group" of the macromonomer building block. The same applies to the two other vinyloxybutylpolyethylene glycols used. FIG. 1 also shows the spacings of the respective distribution maxima of the physical mixture of the copolymers H and K. The reproduced distribution of the ether oxygen atoms corresponding to a "bell graph" is merely schematic (the actual width of the distribution may differ).

All polymer mixtures tested in the use examples below were mixed with small amounts of a conventional antifoam for controlling the air pore content.

Use Examples

Slump according to DIN 12350-5, testing of fresh concrete, 400 kg of CEM 152.5 R Mergelstetten, w/c=0.36, dose 0.21% each The results of the use examples are shown in the diagram of FIG. 2, in which the time in minutes is plotted along the abscissa (N) and the slump in cm along the ordinate (M), circle symbols representing a standard superplasticizer (without mixed side chains), rhombus symbols representing copolymer H as an optimized superplasticizer variant, triangle symbols representing the physical mixture according to the invention of copolymers H and K and square symbols representing the mixture according to synthesis example 3.

Copolymer H (rhombus symbols) as an optimized variant of a standard superplasticizer (Glenium ACE 30 from BASF, which contains no mixed side chains, circle symbols) shows a particularly good workability at a corresponding dose of 0.21% (superplasticizer solid based on cement weight of the mixture) during the first 40 min. In comparison, the physical mixture according to the invention of copolymer H and copolymer K in the mixing ratio of 0.7:0.3, based on the polymer content of the solutions, shows an even more substantially increased performance (triangle symbols) even up to 60 min. The mixture according to synthesis example 3 (square symbols) is inferior to the mixture according to the invention (triangle symbols) since it firstly results in substantially greater subsequent plasticization (increase in the slump from 56 to 63.5 cm during the first 10 min) and secondly does not ensure the workability over time in a comparably good manner (the slump is 55 cm even after 40 minutes, whereas the mixture according to the invention still has a slump of 61 cm after 60 minutes).

The invention claimed is:

1. Polymer composition containing 3 to 95% by weight of a copolymer H and 3 to 95% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, the polyether macromonomer structural units of the copolymers H and K having side chains containing in each case at least 5 ether oxygen atoms, the number of ether oxygen atoms per side chain of the polyether macromonomer structural units of the copolymers H and K varying in each case in such a way that the corresponding frequency distribution diagrams, in which the number of ether oxygen atoms per side chain of a polyether macromonomer structural unit is plotted in each case along the abscissae and the respectively associated frequencies for the copolymers H or K are plotted in each case along the ordinates, contain in each case at least 2 maxima whose abscissa values differ in each case by more than 7 ether oxygen atoms from one another, the frequency distribution diagrams of the copolymers H and K differing from one another in that the abscissa value of at least one maximum of the copolymer H differs in each case by more than 5 ether oxygen atoms from the abscissa values of all maxima of the copolymer K and/or that the arithmetic means of the ether oxygen atoms of the polyether macromonomer structural units of the copolymers H and K differ from one another by more than 5 ether oxygen atoms.

2. Polymer composition according to claim 1, containing 10 to 85% by weight of the copolymer H and 10 to 85% by weight of the copolymer K.

3. Polymer composition according to claim 1, wherein at least 50 mol % of all structural units of the copolymer H and at least 50 mol % of all structural units of the copolymer K are present in each case in the form of acid monomer structural units.

4. Polymer composition according to claim 1, wherein the number of ether oxygen atoms per side chain of the polyether macromonomer structural units of the copolymers H and K vary in each case in such a way that the corresponding frequency distribution diagrams, in which the number of ether oxygen atoms per side chain of a polyether macromonomer structural unit is plotted in each case along the abscissae and the respectively associated frequencies for the copolymers H or K are plotted along the ordinates, contain in each case at least 2 maxima whose abscissa values differ in each case by more than 10 ether oxygen atoms from one another.

5. Polymer composition according to claim 1, wherein the number of ether oxygen atoms per side chain of the polyether macromonomer structural units of the copolymers H and K vary from one another in such a way that the corresponding frequency distribution diagrams, in which the number of ether oxygen atoms per side chain of a polyether macromonomer structural unit is plotted from one another along the abscissae and the respectively associated frequencies for the copolymers H or K are plotted from one another along the ordinates, contain from one another at least 2 maxima whose abscissa values differ from one another by more than 10 ether oxygen atoms, the frequency distribution diagrams of the copolymers H and K differing from one another in that the abscissa value of at least one maximum of the copolymer H differs in each case by more than 10 ether oxygen atoms from the abscissa values of all maxima of the copolymer K.

6. Polymer composition according to claim 1, wherein the acid monomer structural units of the copolymers H and K are present in each case according to one of the general formulae (Ia), (Ib), (Ic) and/or (Id)

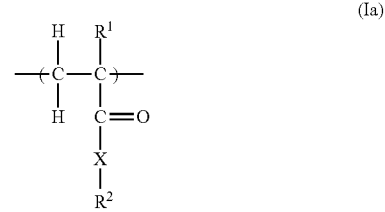

(Ia)

where $R^1$ are identical or different and are represented by H and/or a straight-chain $C_1$-$C_4$ alkyl group or a branched $C_3$-$C_4$ alkyl group;

X are identical or different and are represented by NH—$(C_nH_{2n})$ where n=1, 2, 3 or 4 and/or O—$(C_nH_{2n})$ where n=1, 2, 3 or 4 and/or by a unit not present;

$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

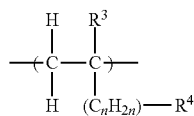
(Ib)

where
R³ are identical or different and are represented by H and/or a straight-chain $C_1$-$C_4$ alkyl group or a branched $C_3$-$C_4$ alkyl group;
n=0, 1, 2, 3 or 4;
R⁴ are identical or different and are represented by $SO_3H$, $PO_3H_2$, O—$PO_3H_2$ and/or para-substituted $C_6H_4$—$SO_3H$;

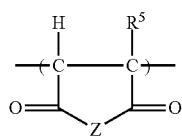
(Ic)

where
R⁵ are identical or different and are represented by H and/or a straight-chain $C_1$-$C_4$ alkyl group or a branched $C_3$-$C_4$ alkyl group;
Z are identical or different and are represented by O and/or NH;

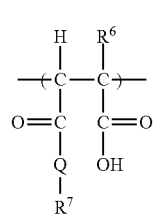
(Id)

where
R⁶ are identical or different and are represented by H and/or a straight-chain $C_1$-$C_4$ alkyl group or a branched $C_3$-$C_4$ alkyl group;
Q are identical or different and are represented by NH and/or O;
R⁷ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O—$(A'O)_\alpha$-$R^9$ where m=0, 1, 2, 3 or 4, e=0, 1, 2, 3 or 4, A'=$C_{x'}H_{2x'}$ where x'=2, 3, 4 or 5 and/or $CH_2C(C_6H_5)H$—, α=an integer from 1 to 350 with R⁹ identical or different and represented by a straight-chain $C_1$-$C_4$ alkyl group or a branched $C_3$-$C_4$ alkyl group.

7. Polymer composition according to claim 1, wherein the acid monomer structural units of the copolymers H and K are produced in each case by incorporation of the acid monomers methacrylic acid, acrylic acid, maleic acid, maleic anhydride and/or monoesters of maleic acid in the form of polymerized units.

8. Polymer composition according to claim 1, wherein the polyether macromonomer structural units of the copolymers H and K are present in each case according to one of the general formulae (IIa), (IIb) and/or (IIc)

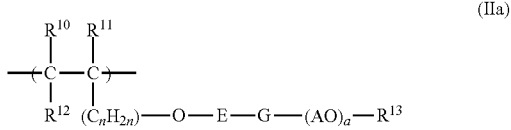
(IIa)

where
$R^{10}$, $R^{11}$ and $R^{12}$ in each case are identical or different and, independently of one another, are represented by H and/or a straight-chain $C_1$-$C_4$ alkyl group or a branched $C_3$-$C_4$ alkyl group;
E are identical or different and are represented by a straight-chain $C_1$-$C_6$ alkylene group or branched $C_3$-$C_6$ alkylene group, a cyclohexyl group, $CH_2$—$C_6H_{10}$, ortho-substituted $C_6H_4$, meta-substituted $C_6H_4$ or para-substituted $C_6H_4$ and/or a unit not present;
G are identical or different and are represented by O, NH and/or CO—NH, with the proviso that, if E is a unit not present, G is also a unit not present;
A are identical or different and are represented by $C_xH_{2x}$ where x=2, 3, 4 and/or 5 and/or $CH_2CH(C_6H_5)$;
n are identical or different and are represented by 0, 1, 2, 3, 4 and/or 5;
a are identical or different and are represented by an integer from 5 to 350;
$R^{13}$ are identical or different and are represented by H, a straight-chain $C_1$-$C_4$ alkyl group or a branched $C_3$-$C_4$ alkyl group, CO—$NH_2$ and/or $COCH_3$;

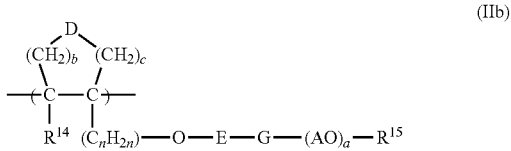
(IIb)

where
$R^{14}$ are identical or different and are represented by H and/or a straight-chain $C_1$-$C_4$ alkyl group or a branched $C_3$-$C_4$ alkyl group;
E are identical or different and are represented by a straight-chain $C_1$-$C_6$ alkylene group or branched $C_3$-$C_6$ alkylene group, a cyclohexyl group, $CH_2$—$C_6H_{10}$, ortho-substituted $C_6H_4$, meta-substituted $C_6H_4$ or para-substituted $C_6H_4$ and/or by a unit not present;
G are identical or different and are represented by a unit not present, O, NH and/or CO—NH, with the proviso that, if E is a unit not present, G is also a unit not present;
A are identical or different and are represented by $C_xH_{2x}$ where x=2, 3, 4 and/or 5 and/or $CH_2CH(C_6H_5)$;
n are identical or different and are represented by 0, 1, 2, 3, 4 and/or 5;
a are identical or different and are represented by an integer from 5 to 350;
D are identical or different and are represented by a unit not present, NH and/or O, with the proviso that, if D is a unit not present: b=0, 1, 2, 3 or 4 and c=0, 1, 2, 3 or 4, where b+c=3 or 4, and with the proviso that, if D is NH and/or O: b=0, 1, 2 or 3, c=0, 1, 2 or 3, where b+c=2 or 3;

$R^{15}$ are identical or different and are represented by H, a straight-chain $C_1$-$O_4$ alkyl group or a branched $C_3$-C4 alkyl group, CO—$NH_2$, and/or $COCH_3$;

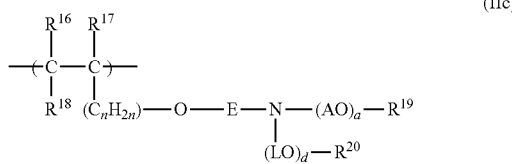
(IIc)

where
$R^{16}$, $R^{17}$ and $R^{18}$ in each case are identical or different and, independently of one another, are represented by H and/or a straight-chain $C_1$-$C_4$ alkyl group or a branched $C_3$-$C_4$ alkyl group;

E are identical or different and are represented by a straight-chain $C_1$-$C_6$ alkylene group or branched $C_3$-$C_6$ alkylene group, a cyclohexyl group, $CH_2$—$C_6H_{10}$ and/or ortho-substituted $C_6H_4$, meta-substituted $C_6H_4$ or para-substituted $C_6H_4$;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

L are identical or different and are represented by $C_xH_{2x}$ where x=2, 3, 4 and/or 5 and/or $CH_2$—$CH(C_6H_5)$;

a are identical or different and are represented by an integer from 5 to 350;

d are identical or different and are represented by an integer from 1 to 350;

$R^{19}$ are identical or different and are represented by H and/or a straight-chain $C_1$-$C_4$ alkyl group or a branched $C_3$-$C_4$ alkyl group;

$R^{20}$ are identical or different and are represented by H and/or a straight-chain $C_1$-$C_4$ alkyl group.

9. Polymer composition according to claim 1, wherein the polyether macromonomer structural units of the copolymers H and K are produced in each case by incorporation of the polyether macromonomers alkoxylated hydroxybutyl vinyl ether and/or alkoxylated isoprenol and/or alkoxylated (meth) allyl alcohol and/or vinylated methylpolyalkylene glycol.

10. Polymer composition according to claim 1, wherein the copolymers H and K have in each case the same or different types of polyether macromonomer structural units and/or acid monomer structural units.

11. Polymer composition according to claim 1, wherein in each case at least 45 mol % of all structural units of the copolymers H and K are produced by incorporation of acid monomer and polyether macromonomer in the form of polymerized units.

12. Dispersant containing at least 30% by weight of water and at least 10% by weight of the polymer composition according to claim 1.

13. Dispersant according to claim 12, which is present in the form of an aqueous solution.

14. Process for the preparation of a polymer composition according to claim 1, wherein the copolymers H and K are each prepared separately from one another in aqueous solution and the separately prepared copolymers or the separately prepared aqueous solutions are then mixed with one another.

15. Process according to claim 14, wherein acid monomer and polyether macromonomer are reacted by free radical polymerization with the use of a peroxide-containing redox initiator system in aqueous solution, the temperature of the aqueous solution during the polymerization being 10 to 45° C. and the pH being 3.5 to 6.5.

16. Process of use of a polymer composition according to claim 1 comprising adding the polymer composition as a dispersant to an aqueous slurry of hydraulic binder and/or of latent hydraulic binder.

17. Process for the preparation of a dispersant according to claim 12, wherein the copolymers H and K are each prepared separately from one another in aqueous solution and the separately prepared copolymers or the separately prepared aqueous solutions are then mixed with one another.

18. Process according to claim 17, wherein acid monomer and polyether macromonomer are reacted by free radical polymerization with the use of a peroxide-containing redox initiator system in aqueous solution, the temperature of the aqueous solution during the polymerization being 10 to 45° C. and the pH being 3.5 to 6.5.

19. Polymer composition according to claim 1, wherein the polyether macromonomer structural units of the copolymers H and K are produced in each case by incorporation of the polyether macromonomers alkoxylated hydroxybutyl vinyl ether and/or alkoxylated isoprenol and/or alkoxylated (meth) allyl alcohol and/or vinylated methylpolyalkylene glycol having in each case an arithmetic mean of 6 to 300 oxyalkylene groups in the form of polymerized units.

20. Polymer composition according to claim 1, wherein in each case at least 80 mol % of all structural units of the copolymers H and K are produced by incorporation of acid monomer and polyether macromonomer in the form of polymerized units.

* * * * *

UNITED STATES PATENT AND TRADEMARK OFFICE
CERTIFICATE OF CORRECTION

PATENT NO. : 8,772,377 B2
APPLICATION NO. : 13/133043
DATED : July 8, 2014
INVENTOR(S) : Lorenz et al.

It is certified that error appears in the above-identified patent and that said Letters Patent is hereby corrected as shown below:

In the Claims,

In Claim 8 at Column 15, line 2, the phrase "$C_1$-$C_4$" is misspelled as "$C_1$-$0_4$".

Also in Claim 8 at Column 15, line 2, the phrase "$C_3$-$C_4$" incorrectly appears as "$C_3$-C4".

Claim 8 at Column 15, line 2, should read "... straight-chain $C_1$-$C_4$ alkyl group or a branched $C_3$-$C_4$...".

Signed and Sealed this
Second Day of December, 2014

Michelle K. Lee
*Deputy Director of the United States Patent and Trademark Office*